United States Patent Office 2,713,563
Patented July 19, 1955

2,713,563
FILLED PLASTISOL COMPOSITIONS AND METHOD OF MAKING SAME

Leroy B. Kuhn, Douglassville, Pa., assignor to The Firestone Tire & Rubber Company, Akron, Ohio, a corporation of Ohio No Drawing. Application March 31, 1953,
Serial No. 346,029

12 Claims. (Cl. 260—31.8)

This invention relates to polyvinyl chloride plastisol compositions containing inorganic fillers and pigments.

The polyvinyl chloride plastisol compositions comprise finely granular vinyl chloride resins dispersed in liquid plasticizers which are relatively inactive toward the resins at ordinary temperatures but which form gels therewith at elevated temperatures. The plastisols before heating are pasty, flowable compositions which may easily be worked into the desired form by spreading, molding, dipping, etc. Thereafter the compositions are heated, whereupon the granular resin fluxes with the plasticizer to form a gel which, upon cooling, comprises a substantially homogeneous body of plasticized vinyl resin.

It would be highly desirable to incorporate inorganic filling materials into plastisol compositions both to reduce the cost of the compositions and also to enhance the physical properties of the final products. The direct incorporation of such filling material into plastisol compositions has certain disadvantages, however; the unconverted plastisol compositions are much less readily flowable, and in the final converted gel, a considerable portion of the plasticizer becomes associated with the filler material, which both weakens the bond between the filler and the resin, and also sequesters the plasticizer in a form in which it does not function in the resinous phase.

Accordingly, it is an object of this invention to provide novel and improved polyvinyl chloride plastisol compositions containing inorganic fillers.

Another object is to provide such compositions which will be readily flowable in the unconverted state.

A further object is to provide such compositions which in the heat-converted state, will have improved physical properties.

SYNOPSIS OF THE INVENTION

The above and other objects are secured, in accordance with this invention, in plastisols made from vinyl resins which are prepared by spray-drying of latices in which the filler materials are dispersed in advance of the spray drying. The latex-filler composition to be spray-dried must be prepared by a special procedure, as follows: the latex is prepared by emulsion polymerization of vinyl chloride in a system employing only minimum quantities of emulsifying agents at the outset of the reaction. Additional emulsifying agents are added as required during the polymerization to avoid coagulation. The resultant latex is characterized by having the bulk of the latex particles of relatively large size, in the range of 0.1–0.2 micron in diameter. Sufficient additional emulsifying agent is added after the polymerization to saturate the surface of the latex particles, and the filler material is then incorporated. The resultant compounded latex is then spray dried. The spray dried product appears under the microscope to consist of granules of the filler completely covered with resin. When the product is blended with plasticizers to form a plastisol, the resultant compositions are very much freer flowing than comparable plastisols in which the filler is added directly to the plastisol composition. The heat-converted plastisols of this invention also have physical properties very much superior to those of conventional plastisol compositions, and are of course cheaper than conventional plastisol compositions.

THE PREPARATION OF THE LATEX

The latices for use in invention may be prepared either from pure vinyl chloride, or from mixtures of vinyl chloride with minor proportions of other ethylenically unsaturated compounds copolymerizable therewith. Such mixtures should contain at least 80% of vinyl chloride, the balance being the unsaturated compound copolymerizable therewith. Suitable unsaturated compounds include, for instance, vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like. For a fairly complete list of materials known to polymerize with vinyl chloride, reference may be had to Krczil "Kurzes Handbuch Der Polymerisations-Technik—11 Mehrstoff Polymerization," Edward Bros. Inc., 1945, pp. 735–747, the items under "Vinyl chlorid." As a rough rule, the criterion of a practical comonomer for use with vinyl chloride, to produce copolymers containing from 80% or more of vinyl chloride is that, on a mole percentage basis, an initial charge of 96% vinyl chloride, balance comonomer, shall yield an initial copolymer containing (a) at least 90% vinyl chloride, and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $Q_{\text{vinyl chloride}} = .03$, and $e_{\text{vinyl chloride}} = .3$:

$$4.1 > \frac{.029e^{-.3(.3-e_2)}}{Q_2} + .04 \over 1.33 Q_2 e^{e_2(.3-e_2)} + .96 > .37$$

Instead of the single unsaturated comonomers of the types above indicated, mixtures of such comonomers may enter into the copolymers, it being understood that the total quantity thereof shall be small enough (i. e., not over 20% based on the weight of the copolymer) that the essential character of the polyvinyl chloride chain is retained.

The polymerization of the vinyl chloride or mixture thereof with the copolymerizable material is carried out by agitating the monomeric material, together with suitable catalytic agents and at temperatures (40°–85° C.) usually employed in such polymerizations, with water containing only minimal quantities of emulsifying agents, on the order of .03–.08% by weight of the total charge. The polymerization is permitted to proceed, and additional emulsifying agents are added as required to prevent breakdown of the latex. As a rough operating rule, the total amount of emulsifying agents added (i. e., original plus any increments) should be kept below the figure .03–.08% cited above, until about 15% of the monomers have become polymerized. After this point, the character of the polymerization reaction has become established, and it does not greatly matter thereafter how much emulsifying agents are added within the limits of the amount of emulsifying agents conventionally added during vinyl chloride polymerization, say up to one or two percent, based on the monomer charge, although it is preferable to keep the reaction "starved" for emulsifier, i. e., to add only sufficient quantities to prevent breakdown of the latex. At the conclusion of the polymerization, usually when about 80% to 90% of the monomers have become polymerized, the unreacted monomers are vented and, if sufficient emulsifying agents have not already been added to completely cover the surface of the polymer particles in the latex, further quantities are added to effect this result. This state is characterized by a low surface tension (say 25 to 35 dynes/cm.) of the latex and appear to reflect a condition in which the absorptive surfaces of the latex particles have been saturated with emulsifier molecules, and additional molecules have become available to lower the surface tension. Latices prepared as above described are characterized by relatively large diameter of the resin particles therein.

Referring to the emulsifying agents to be employed in the polymerization reaction, there may be in general compounds containing (1) a hydrocarbon group having from about 8 to about 22 carbon atoms and (2) a solubilizing ionizing group such as an ammonium or alkali metal carboxylate group, an ammonium or alkali metal sulfate ester group, an ammonium or alkali metal sulfonate group, analogous phosphate and phosphonate groups, or an acidified primary, secondary, tertiary or quaternary amine group. Samples of suitable emulsifying agents are the fatty soaps such as sodium laurate, potassium stearate, ammonium oleate, sodium salts of abietic acid and its derivatives such as sodium salts of rosin and hydrogenated, dehydrogenated and disproportionated rosin; alkali metal and ammonium hydrocarbon sulfonates such as sodium naphthalene sulfonate, nuclearly alkylated sodium benzene sulfonates and naphthalene sulfonates, sodium sulfosuccinate, and the sodium salts of the products produced by the reaction of paraffins with sulfuryl chloride under ultraviolet light; alkali metal and ammonium sulfate half-esters such as sodium lauryl sulfate, sodium salts of sulfates of alcohols produced by the reduction of cocoanut or other natural oil fatty acids, Turkey red oil and the like; and amine salts such as lauryl amine hydrochloride or stearyl-amine hydrochloride. In the cases where persulfate catalysts are employed, such as ammonium, sodium, potassium or lithium persulfate, the catalyst reacts with the monomeric constituents to produce in situ organic sulfates and sulfonates of the general class set forth above so as to supply a portion, and in some cases all, of the necessary micelle-forming emulsifying agent. Particularly in the case of the emulsifier to be added at the close of the polymerization reaction the products obtained by condensing formaldehyde with sulfonated naphthalene are highly advantageous; when so used the condensate should be present to the extent of from 2–10%, based on the weight of polymer in the latex.

The catalysts to be used in the polymerization are in general any of the water-soluble free-radical-generating catalysts ordinarily used in the production of vinyl chloride latices, such as hydrogen peroxide, di-t-butyl peroxide, t-butyl hydroperoxide, peracetic acid, and ammonium and alkali metal salts of the inorganic peracids such as ammonium persulfate, sodium persulfate, potassium persulfate, potassium perborate, sodium percarbonate and the like. The use of these water-soluble catalysts is absolutely essential to the production of suitable latices for use in this invention. They will ordinarily be employed to the extent of from 0.02 to 1.0% based on the weight of the monomers in the reaction charge.

The amount of water used in the polymerization reaction should be as small as possible while retaining stability of the latex, since this water must be subsequently evaporated in the spray-drying step. Generally, the water used should constitute from about 45% to about 70%, based on the total weight of the latex finally produced. Observance of the techniques above described enables the use of these relatively lesser quantities of water as compared to usual practice. Also the latex produced contains predominately resin particles having diameters of 0.1 micron or larger; usually, about 80% of the weight of the resin will be contained in particles ranging 0.1–0.2 micron in diameter.

THE FILLER MATERIALS

These may be any of the finely divided insoluble inorganic filler materials ordinarily used in compounding vinyl chloride plastisols, such as silica, calcium carbonate, carbon black, barium sulfate, clay, calcined clay, alumina, bentonite and the like. These pigments should be prepared so as to have particle diameters on the order of 0.5–10.0 microns. The filler materials are preferably first emulsified in water, and the resultant emulsion blended with the latex. The amount of filler used may vary from about 10% to 60%, based on the total weight of resin and filler.

THE SPRAY DRYING OPERATION

This may be done in any usual spray drying equipment, such as the rotary disk type, or the compressed-air atomizer type. Conditions of atomization should be adjusted to secure final dried particles only slightly larger than the filler particles, e. g., having diameters on the order of 0.5–15.0 microns. The drying atmosphere should be supplied at temperatures sufficient to effect slight fusion of the resin, e. g., with supply in the range of 250°–500° F., and preferably 350°–400° F., the quantity of drying atmosphere supplied being sufficient that the exhausted drying gases have a temperature of at least 220° F.

The dried particles, when examined under the microscope, will be found to consist of particles of the filler material completely coated with the vinyl chloride resin.

COMPOUNDING OF THE DRIED RESIN

The dried, powdered resin behaves upon compounding in a manner substantially the same as ordinary vinyl chloride resins designed for plastisol use, but not containing fillers. When blended with liquid plasticizers, the dried resins prepared as above described flow readily and smoothly in all operations usually employed with plastisol compositions, such as casting, spreading, dipping, roller coating and the like. The plastisols generally contain from about 33% to 50% of the resin-filler composition prepared as above described, the percentage being on the total weight of plasticizer plus resin-filler composition.

With the foregoing general discussion in mind, there are given herewith detailed examples of the practice of this invention. All parts given are by weight.

*Example 1*

A. Preparation of latex:

|  | Parts |
|---|---|
| Vinyl chloride | 45 |
| Water | 55 |
| Potassium persulfate | 0.1 |
| Sodium lauryl sulfate ("Duponol ME," a product of E. I. du Pont de Nemours and Company) initial | 0.06 |
| At 15% conversion | 0.54 |

The water, potassium persulfate and initial portion of sodium lauryl sulfate were charged into an autoclave provided with a rotary stirrer. Agitation was commenced and maintained throughout the subsequent process. The autoclave was closed, a vacuum applied, and the free space purged with nitrogen. The vinyl chloride was then charged, the temperature raised to 45° C., and maintained at this value throughout the subsequent reaction. The conversion of vinyl chloride to polymer was followed analytically, and when 15% thereof had become converted to resin, the additional portion of sodium lauryl sulfate was charged. The reaction was continued for a total of 24 hours, at the end of which time 85% of the vinyl chloride had become polymerized. At this point, the temperature was lowered to 25° C., and the excess vinyl chloride was vented.

B. Saturation of polymer particle surfaces:

|  | Parts |
|---|---|
| Polyvinyl chloride latex (prepared as just described: contains about 42.5% resin, based on the total weight of latex) | 100 |
| Sodium salt of naphthalene sulfonic acid-formaldehyde condensate ("Daxad 11," a product of Dewey & Almy Chemical Company) | 0.9 |

The above formulation provides approximately 2% of the sodium salt of the naphthalene sulfonic acid-formaldehyde condensate, based on the weight of the resin in the latex. The sodium salt was added gradually to the latex with gentle stirring. The original surface tension of the latex was 45 dynes per centimeter, which sharply decreased to 30 dynes per centimeter upon addition of the last portions of the sodium salt.

C. Addition of filler and spray drying:

|  | Parts |
|---|---|
| Polyvinyl chloride latex (containing sodium salt of naphthalene sulfonic acid-formaldehyde condensate added as just described) | 100 |
| Ground calcium carbonate filler (particle diameters 1–5 microns, free from particles over 15 microns: "Atomite," a product of Thompson-Weinman Company) | 11 |

The above schedule provides approximately 25% of the calcium carbonate, based on the total weight of resin in the latex plus calcium carbonate. The calcium carbonate was first emulsified in twice its weight of water containing 3% by weight of the same sodium salt of naphthalene sulfonic acid-formaldehyde condensate, and the emulsion was gradually introduced into the latex with moderate stirring.

The latex containing the filler was then spray dried. Atomization was by a compressed air atomizer, and the drying gases were supplied at 400° F. in sufficient volume to maintain the outlet gases at 220° F. The product contained particle sizes in the range 1–15 microns, and had a bulking density of .66 grams per cubic centimeter.

D. Formulation and testing:

| (1) | Parts |
|---|---|
| Filled resin (prepared as just described, containing 25% of filler) | 60 |
| Di-(2-ethyl-hexyl)phthalate | 35 |

| (2) | Parts |
|---|---|
| Unfilled resin (spray dried from the same latex prepared as described at A and B above, but containing no filler) | 45 |
| Ground calcium carbonate filler (particle diameters ranging 1–5 microns "Atomite," a product of Thompson-Weinman Co.) | 15 |
| Di-(2-ethyl-hexyl)phthalate | 35 |

Recipes (1) and (2) both provide the same gross composition of resin, filler and plasticizer. Each composition was mixed in an S-blade mixer for 10 minutes. At the end of this time the two mixtures were compared with respect to fluidity. A 50-gram sample of the composition of recipe (1) flowed through a standard funnel in 25 seconds; the composition of recipe (2) refused to flow through the same funnel.

The two formulations were spread as films to a thickness of .02 inch on polished steel plates, which were then heated to 340° F. in an oven. The plates were then removed from the oven, cooled, and the films stripped off the plates. Following are the properties of the films.

TABLE I

|  | Composition No. 1 (Spray dried with filler) | Composition No. 2 (Spray dried, filler added subsequently) |
|---|---|---|
| Elongation at break (percent) | 200 | 160 |
| Modulus of Elasticity (Pounds per square inch) | 785 | 630 |
| Tensile Strength (Pounds per square inch) | 1,120 | 720 |

It will be seen that Composition No. 1, prepared in accordance with this invention is far superior to Composition No. 2, not prepared in accordance with this invention. Results similar to the above were obtained with silica and alumina fillers in place of the calcium carbonate filler.

From the foregoing general discussion and detailed specific example, it will be evident that this invention provides a process for the production of novel filled plastisol compositions of greatly improved properties, notably fluidity of the unconverted paste and enhanced tensile properties of the converted compositions. The compositions of this invention also permit the lowering of the cost of plastisol compositions of any given characteristics, since the cheaper filling materials may be introduced, in accordance with this invention, without interfering with the behavior of the plastisol compositions.

What is claimed is:

1. Process of producing a granular filled vinyl chloride resin product adapted for plastisol uses, said process comprising (I) polymerizing in aqueous emulsion a monomeric substance selected from the group consisting of vinyl chloride and mixtures thereof with other ethylenically unsaturated compounds copolymerizable therewith, to yield a resin containing at least 80% of vinyl chloride polymerized therein, said polymerization being carried out (A) in the presence of .03–.08% of emulsifying agents, based on the total weight of the polymerization charge up to the time at which 15% of the monomeric substance has become polymerized and (I–B) thereafter continuing the polymerization, (II) discontinuing the polymerization at the desired stage of conversion and adding an insoluble inorganic filler material having particle sizes in the range 0.5–10.0 microns, sufficient emulsifying agents having been added during the continued polymerization step (I–B) and before the addition of said filler to prevent coagulation of the latex during the continued polymerization step (I–B) and to completely saturate the adsorptive capacity of the resin particles in the latex before the addition of the filler and (III) spray-drying the latex and filler at temperatures such as to fuse the resin particles.

2. Process of producing a granular filled vinyl chloride resin product adapted for plastisol uses, said process comprising (I) polymerizing vinyl chloride in aqueous emulsion, said polymerization being carried out (A) in the presence of .03–.08% of emulsifying agents, based on the total weight of the polymerization charge up to the time at which 15% of the vinyl chloride has become polymerized and (I–B) thereafter continuing the polymerization (II) discontinuing the polymerization at the desired stage of conversion, and adding an insoluble inorganic filler material having particle sizes in the range 0.5–10.0 microns, sufficient emulsifying agents having been added during the continued polymerization step (I–B) and before the addition of said filler to prevent coagulation of the latex during the continued polymerization step (I–B) and to completely saturate the adsorptive capacity of the resin particles in the latex before the addition of the filler and (III) spray-drying the latex and filler at temperatures such as to fuse the resin particles.

3. Process of producing a granular filled vinyl chloride resin product adapted for plastisol uses, said process comprising (I) polymerizing in aqueous emulsion a monomeric substance selected from the group consisting of vinyl chloride and mixtures thereof with other ethylenically unsaturated compounds copolymerizable therewith to yield a resin containing at least 80% of vinyl chloride polymerized therein, said polymerization being carried out (A) in the presence of .03–.08% of emulsifying agents, based on the total weight of the polymerization charge up to the time at which 15% of the monomeric substance has become polymerized and (I–B) thereafter continuing the polymerization, (II) discontinuing the polymerization at the desired stage of conversion and adding an insoluble inorganic filler material having particle sizes in the range 0.5–10.0 microns, sufficient emulsifying agents having been added during the continued polymerization step (I–B) and before the addition of said filler to prevent coagulation of the latex during the continued polymerization step (I–B) and to completely saturate the adsorptive capacity of the resin particles in the latex before the addition of the filler, said emulsifying agents including 2–10% of a condensate of formaldehyde and a sulfonated aromatic hydrocarbon, and (III) spray-drying the latex and filler at temperatures such as to fuse the resin particles.

4. Process of producing a granular filled vinyl chloride resin product adapted for plastisol uses, said process comprising (I) polymerizing in aqueous emulsion a monomeric substance selected from the group consisting of vinyl chloride and mixtures thereof with other ethylenically unsaturated compounds copolymerizable therewith to yield a resin containing at least 80% of vinyl chloride polymerized therein, said polymerization being carried out (A) in the presence of .03–.08% of emulsifying agents, based on the total weight of the polymerization charge up to the time at which 15% of the monomeric substance has become polymerized and (I–B) thereafter continuing the polymerization, (II) discontinuing the polymerization at the desired stage of conversion and adding a calcium carbonate filler to prevent coagulation of the latex during the continued polymerization step (I–B) and to completely saturate the adsorptive capacity of the resin particles in the latex before the addition of the filler and (III) spray-drying the latex and filler at temperatures such as to fuse the resin particles.

5. Process of producing a granular filled vinyl chloride resin product adapted for plastisol uses, said process comprising (I) polymerizing vinyl chloride in aqueous emulsion, said polymerization being carried out (A) in the presence of .03–.08% of emulsifying agents, based on the total weight of the polymerization charge up to the time at which 15% of the vinyl chloride has become polymerized and (I–B) thereafter continuing the polymerization, (II) discontinuing the polymerization at the desired state of conversion, and adding a calcium carbonate filler material having particle sizes in the range 0.5–10.0 microns, sufficient emulsifying agents having been added during the continued polymerization step (I–B) and before the addition of said calcium carbonate filler to prevent coagulation of the latex during the continued polymerization step (I–B) and to completely saturate the adsorptive capacity of the resin particles in the latex before the addition of the filler, said emulsifying agents including 2–10% of a condensate of the formaldehyde and a sulfonated aromatic hydrocarbon, and (III) spray-drying the latex and filler at temperatures such as to fuse the resin particles.

6. Process of producing a plastisol composition, said process comprising (I) polymerizing in aqueous emulsion a monomeric substance selected from the group consisting of vinyl chloride and mixtures thereof with other ethylenically unsaturated compounds copolymerizable therewith to yield a resin containing at least 80% of vinyl chloride polymerized therein, said polymerization being carried out (A) in the presence of .03–.08% of emulsifying agents, based on the total weight of the polymerization charge up to the time at which 15% of the monomeric substance has become polymerized and (I–B) thereafter continuing the polymerization, (II) discontinuing the polymerization at the desired stage of conversion and adding an insoluble inorganic filler material having particle sizes in the range 0.5–10.0 microns, sufficient emulsifying agents having been added during the continued polymerization step (I–B) and before the addition of said filler to prevent coagulation of the latex during the continued polymerization step (I–B) and to completely saturate the adsorptive capacity of the resin particles in the latex before the addition of the filler, (III) spray-drying the latex and filler at temperatures such as to fuse the resin particles and (IV) dispersing the dried resin and filler in a liquid plasticizer for the resin.

7. Process of producing a plastisol composition, said process comprising (I) polymerizing vinyl chloride in aqueous emulsion, said polymerization being carried out (A) in the presence of .03–.08% of emulsifying agents, based on the total weight of the polymerization charge up to the time at which 15% of the vinyl chloride has become polymerized and (I–B) thereafter continuing the polymerization, (II) discontinuing the polymerization at the desired stage of conversion, and adding a calcium carbonate filler material having particle sizes in the range 0.5–10.0 microns, sufficient emulsifying agents having been added during the continued polymerization step (I–B) and before the addition of said calcium carbonate filler to prevent coagulation of the latex during the continued polymerization step (I–B) and to completely saturate the adsorptive capacity of the resin particles in the latex before the addition of the filler, said emulsifying agents including 2–10% of a condensate of formaldehyde and a sulfonated aromatic hydrocarbon, (III) spray-drying the latex and filler at temperatures such as to fuse the resin particles and (IV) dispersing the dried resin and filler in a liquid plasticizer for the resin.

8. Process of producing a plastisol composition said process comprising (I) polymerizing in aqueous emulsion a monomeric substance selected from the group consisting of vinyl chloride and mixtures thereof with other ethylenically unsaturated compounds copolymerizable therewith, said polymerization being carried out (A) in the presence of .03–.08% of emulsifying agents, based on the total weight of the polymerization charge up to the time at which 15% of the monomeric substances have become polymerized, and (I–B) thereafter continuing the polymerization, (II) discontinuing the polymerization at the desired stage of conversion and adding an insoluble inorganic filler material having particle sizes in the range 0.5–10.0 microns, sufficient emulsifying agents having been added during the continued polymerization step (I–B) and before the addition of said filler to prevent coagulation of the latex during the continued polymerization step (I–B) and to completely saturate the adsorptive capacity of the resin particles in the latex before the addition of the filler, (III) spray-drying the latex and filler at temperatures such as to fuse the resin particles, (IV) dispersing the dried resin and filler in a liquid plasticizer for the resin and (V) subjecting the resultant plastisol to heat to convert the same to the gel state.

9. A granular filled vinyl chloride resin product characterized by a high degree of fluidity when admixed with liquid plasticizers, said product having been produced by the process of claim 1.

10. A granular filled vinyl chloride resin product characterized by a high degree of fluidity when admixed with liquid plasticizers, said product having been produced by the process of claim 5.

11. A free-flowing filled vinyl chloride resin plastisol composition, said composition having been prepared by the process of claim 6.

12. A heat-converted filled vinyl chloride resin composition characterized by a high degree of tensile strength and high modulus of elasticity, said composition having been prepared by the process of claim 8.

References Cited in the file of this patent

UNITED STATES PATENTS

| | | |
|---|---|---|
| 2,455,042 | Morgan et al. | Nov. 30, 1948 |
| 2,600,122 | Meyer et al. | June 10, 1952 |